US011651359B2

(12) United States Patent
McDonald et al.

(10) Patent No.: US 11,651,359 B2
(45) Date of Patent: May 16, 2023

(54) DISTRIBUTED ELECTRONIC LEDGER WITH METADATA

(71) Applicant: The Toronto-Dominion Bank, Toronto (CA)

(72) Inventors: Ian James McDonald, Toronto (CA); Adam Douglas McPhee, Toronto (CA); Perry Aaron Jones Haldenby, Toronto (CA); Paul Mon-Wah Chan, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 1426 days.

(21) Appl. No.: 15/285,869

(22) Filed: Oct. 5, 2016

(65) Prior Publication Data

US 2018/0096349 A1   Apr. 5, 2018

(51) Int. Cl.
| | | |
|---|---|---|
| *G06Q 20/38* | (2012.01) |
| *G06Q 20/20* | (2012.01) |
| *G06Q 20/10* | (2012.01) |
| *G06Q 20/06* | (2012.01) |

(52) U.S. Cl.
CPC ..... *G06Q 20/3829* (2013.01); *G06Q 20/0658* (2013.01); *G06Q 20/102* (2013.01); *G06Q 20/20* (2013.01); *G06Q 20/38215* (2013.01); *G06Q 2220/00* (2013.01)

(58) Field of Classification Search
USPC .......................................................... 705/71
See application file for complete search history.

(56) References Cited

U.S. PATENT DOCUMENTS

| 8,560,464 B2 | 10/2013 | Smith et al. |
| 2003/0070080 A1* | 4/2003 | Rosen .................. G06Q 20/381 |
| | | 713/187 |
| 2007/0200664 A1* | 8/2007 | Proska .................. G08G 1/205 |
| | | 340/5.72 |

(Continued)

FOREIGN PATENT DOCUMENTS

WO       2015/171580 A1     11/2015

OTHER PUBLICATIONS

White, How Computers Work 7th Ed, p. 4 (Year: 2003).*

(Continued)

*Primary Examiner* — Zeshan Qayyum
*Assistant Examiner* — Cristina Owen Sherr
(74) *Attorney, Agent, or Firm* — Duane Morris LLP

(57) ABSTRACT

A system has a storage medium encoded with program instructions, and a processor coupled to access the program instructions. The instructions configure the processor for: receiving a first request at a POS terminal to surrender a previously purchased first asset in exchange for at least a portion of a second asset that was used to purchase the first asset, receiving the private key from the first asset; accessing a set of rules stored in a distributed electronic ledger, the set of rules specifying conditions associated with the first request; transmitting an authorization to return the at least a portion of the second asset in exchange for surrender of the first asset, in the case where the conditions are satisfied; and invalidating the first request in the case where one or more of the conditions are not satisfied.

20 Claims, 6 Drawing Sheets

(56) References Cited

U.S. PATENT DOCUMENTS

| | | | |
|---|---|---|---|
| 2009/0038741 A1* | 2/2009 | Mueller | G09F 3/10 |
| | | | 428/41.3 |
| 2011/0178926 A1 | 7/2011 | Lindelsee et al. | |
| 2012/0011072 A1* | 1/2012 | Lodolo | G06Q 30/016 |
| | | | 705/302 |
| 2015/0081566 A1 | 3/2015 | Slepinin | |
| 2015/0227922 A1 | 8/2015 | Filler | |
| 2015/0379510 A1 | 12/2015 | Smith | |
| 2016/0085955 A1* | 3/2016 | Lerner | H04L 9/0869 |
| | | | 726/20 |
| 2016/0092988 A1* | 3/2016 | Letourneau | G06Q 20/223 |
| | | | 705/66 |
| 2016/0109954 A1* | 4/2016 | Harris | G06V 20/20 |
| | | | 345/156 |
| 2017/0046806 A1* | 2/2017 | Haldenby | H04L 9/0861 |

OTHER PUBLICATIONS

Nick Szabo, "A Formal Language for Analyzing Contracts", Nick Szabo's Papers and Concise Tutorials, Copyright (c) 2002, downloaded via the internet on Jun. 8, 2016 at URL: http://szabo.best.vwh.net/contractlanguage.html, 23 pages.

Joe Dewey, "What is a Smart Contract?" Big Law Business, Sep. 24, 2015, downloaded via the internet on Jun. 8, 2016 at URL: http://bol.bna.com/what-is-a-smart-contract/, 5 pages.

Jay Cassano, "What Are Smart Contracts? Cryptocurrency's Killer App", 10 Minute Read / App Economy, Sep. 17, 2014, downloaded via the internet on Jun. 8, 2016 at URL: http://www.fastcompany.com/3035723/app-economy/smart-contracts-could-be-cryptocurrencys-killer-app, 10 pages.

* cited by examiner

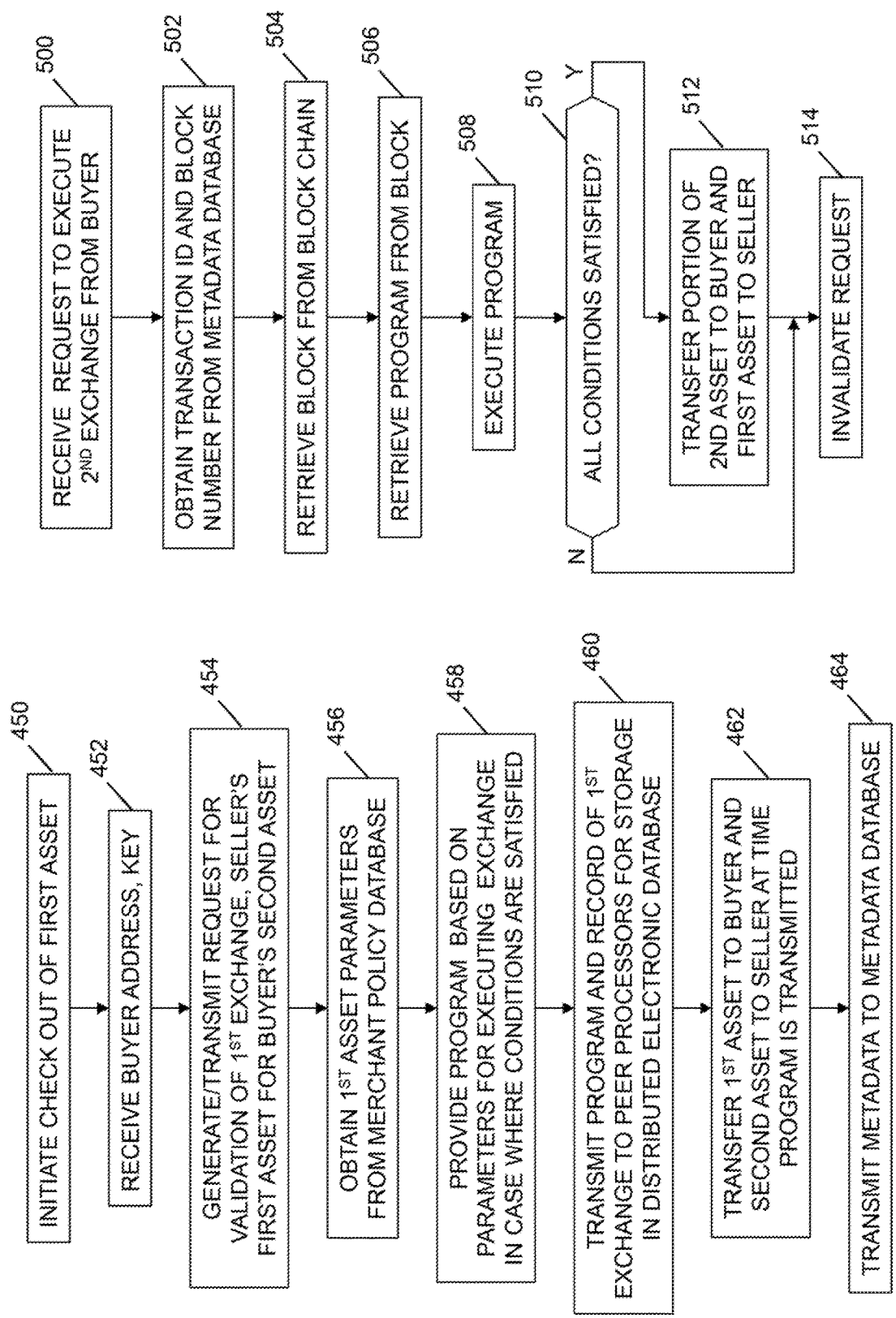

FIG. 7

| | |
|---|---|
| Returnable ? | Y/N |
| Full Refund Period (Days) | No. Days |
| Pro-rated Refund Period (After full return period) | No. Days |
| Required to be Free from Damage/Failure for Return? | Y/N |
| Consumable Materials? | Y/N |
| Acceptable if materials consumed | Y/N |
| Reduction in refund if materials consumed | 0%-100% |
| Max use for refund | No. hours |
| Warranty Available ? | Y/N |
| Warranty Period | Months |
| Exclusions or Disclaimers? | Conditions |

DISTRIBUTED ELECTRONIC LEDGER WITH METADATA

FIELD

This disclosure relates generally to improvements in computer related technology.

BACKGROUND

Distributed electronic ledgers, such as block chains, have generated interest in a variety of fields as a decentralized data storage mechanism with reliable redundant validation.

A block chain includes a distributed database comprising blocks of data records (e.g., transaction records). Each block has a timestamp and a hash of the immediately preceding block. Blocks record and confirm valid transactions. Users known as miners perform proof-of-work in the course of generating the blocks. Each transaction identifies a source address, a destination address, and an amount transferred from the source to the destination. Many account holders have been attracted to digital currencies based on block chains, such as "BITCOIN™", because the public ledger contains no information about the parties, other than addresses, allowing anonymity.

SUMMARY

In some embodiments, a system comprises a non-transitory machine readable storage medium encoded with program instructions, and a processor coupled to the storage medium to access the program instructions. The instructions configure the processor to perform a method comprising: receiving a first request at a point-of-service (POS) terminal to surrender a previously purchased first asset in exchange for at least a portion of a second asset, wherein the second asset was used to purchase the first asset, and the first request includes a public key of the first asset; transmitting a second request to the first asset for a private key associated with the public key; receiving the private key associated with the public key from the first asset; accessing a set of rules stored in a distributed electronic ledger, the set of rules specifying conditions associated with the first request; transmitting an authorization to return the at least a portion of the second asset in exchange for surrender of the first asset, in the case where the conditions are satisfied; and invalidating the first request in the case where one or more of the conditions are not satisfied.

In some embodiments, a point-of-service (POS) terminal comprises a non-transitory machine readable storage medium encoded with program instructions, and a processor coupled to the storage medium to access the program instructions. The instructions configure the processor to perform a method comprising: generating and transmitting a request for validation of a first exchange of a first asset of a seller for a second asset of a buyer; receiving a validation of the first exchange; querying an electronic database containing parameters; obtaining from the electronic database a subset of the parameters associated with the first asset, the parameters defining a second exchange in which the first asset is surrendered in exchange for at least a portion of the second asset; automatically providing a program based on a subset of the parameters, the program containing instructions for executing the second exchange in the case where one or more conditions based on the subset of the parameters are satisfied; and transmitting the program and a first record of the first exchange to a plurality of peer processors for storage in a distributed electronic ledger, wherein the first exchange is executed by transferring the first asset to the buyer and transferring the second asset to the seller at a time the program and the first record are transmitted.

In some embodiments, a method comprises: transmitting a first request to surrender a previously purchased first asset in exchange for at least a portion of a second asset from a point-of-service (POS) terminal to a distributed database processor, wherein the second asset was used to purchase the first asset, and the request includes a public key of the first asset; transmitting to the first asset a request for a private key associated with the public key; receiving from the first asset the private key associated with the public key; accessing a set of rules stored in a distributed electronic ledger, the set of rules specifying conditions associated with the first request; transmitting an authorization to return the at least a portion of the second asset in exchange for surrender of the first asset, in the case where the conditions are satisfied; and invalidating the first request in the case where the conditions are not satisfied.

BRIEF DESCRIPTION OF THE DRAWINGS

FIG. 4 is a flow chart of an embodiment of a method of extracting metadata related to a POS purchase and providing the metadata to a database in the system of FIG. 1.

FIG. 5 is a flow chart of an embodiment of a method of automating a return of the goods purchased in the method of FIG. 5, using the system of FIG. 1.

FIG. 7 shows an embodiment of metadata extracted during a POS purchase in the example of FIG. 5.

DETAILED DESCRIPTION

Figure 1:
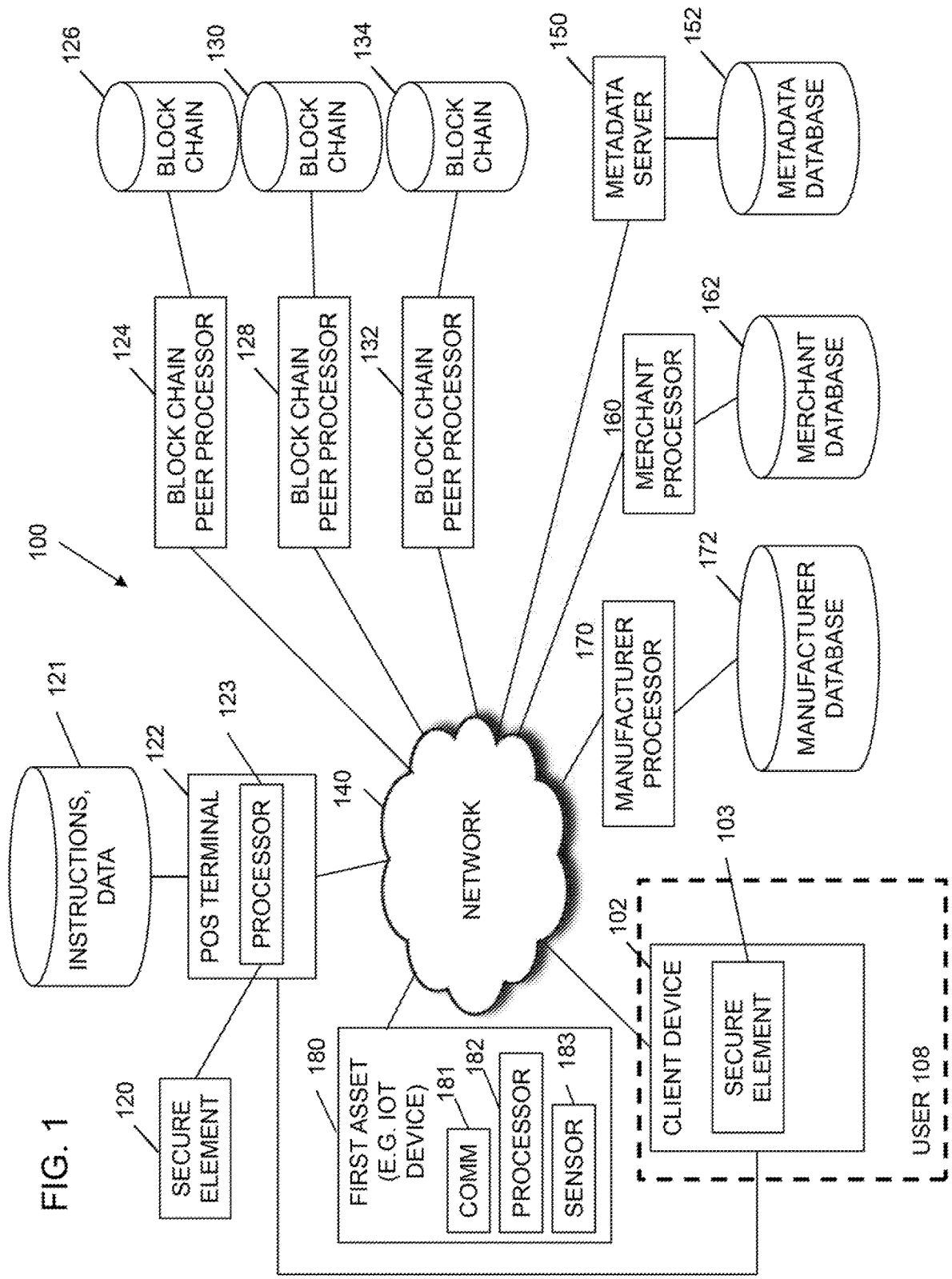
FIG. 1 is a block diagram of a system according to some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The anonymity of digital currency transactions is considered an attractive feature to many users. At the same time that users appreciate the privacy of block chain tracked assets, instances may also arise in which it is advantageous to obtain additional information about the tracked assets and their histories. For example, in a series of two or more related transactions, various parties may have uses for additional data about their transactions. Various block chain programs allow storage of additional information. For example, a transferor (sender) of a block chain tracked asset can store extra information within the transaction block. However any information residing in the block is available to anyone with read access to the block chain. This can be undesirable in the case where the transaction involves highly sensitive information.

Some embodiments of a method described below store additional information related to a transaction in a separate database in a non-transitory storage medium that is not easily accessible by the public. Users of this information related to the transaction can access the database at different frequencies than the frequency at which they access the transaction records in the block chain itself. In some embodiments, the database is optimized for rapid access to the data on demand.

In some embodiments, at the time of a point-of-service (also referred to as point-of-sale or POS) purchase, the buyer pays the seller using a block chain tracked asset (e.g., digital currency) as a medium of exchange. The buyer presents a device, such as a near-field-communications (NFC) equipped phone or a hardware wallet to the POS terminal. The POS terminal generates a transaction and sends this transaction to a plurality of block chain peer processors. The POS terminal also appends metadata to the transaction ID of the transaction and sends this metadata to a separate non-public database that tracks the transaction metadata.

The transaction metadata can include, but is not limited to: shelf-keeping-unit (SKU) level data (related to a first asset that is purchased), merchant classification, location of transaction, Transaction ID, and the like. These data are communicated via a POS network connection to one or more financial servers which store the data. In this context, the term "merchant" can refer to a proprietorship, a partnership, or a corporate entity having one or more stores at corresponding locations.

Subsequently, the data can be accessed to link transactions together, to verify the validity of transactions, for fraud detection, or for other purposes. For example, as described below, the data can be used for validation of merchandise returns or early termination of service contracts and/or access to access controlled digital content.

Figure 3:
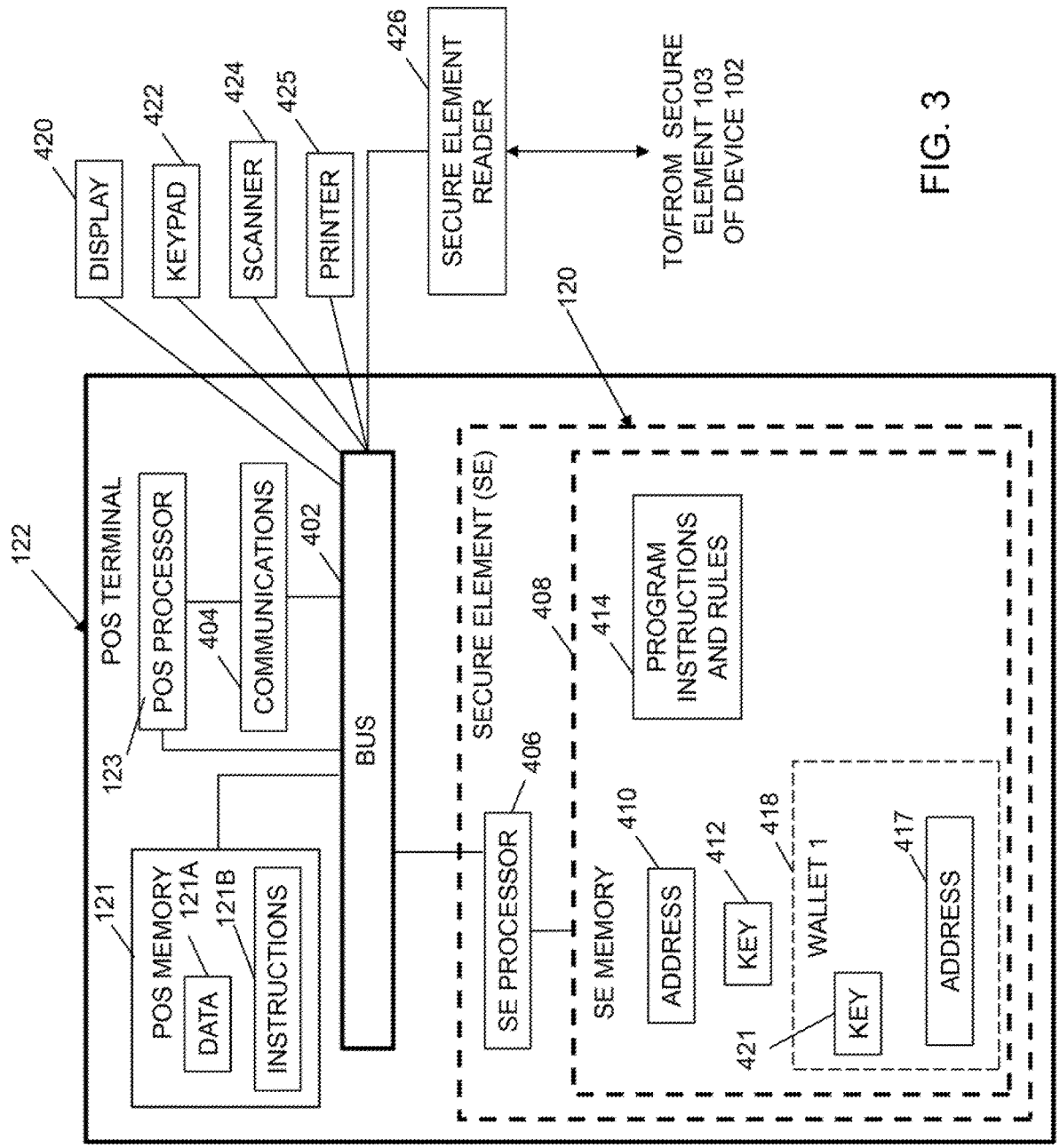
FIG. 3 is a block diagram of an embodiment of the POS terminal of FIG. 1.

FIG. 1 is a block diagram of a system 100 in accordance with some embodiments of the present disclosure. System 100 may be a computing environment including one or more block chain peer processing systems 124, 128, 132, and client devices such as client 102. In some embodiments, one or more clients 102 have respective secure elements 103. A point of service (POS) terminal 122 is located in a merchant's facility. In some embodiments, the POS terminal 122 has a processor 123, a secure element 120 and/or a secure element reader 426 (FIG. 3). A metadata server 150 has a non-transitory machine readable storage device storing a metadata database 152 containing information about the transactions recorded in the block chain 126.

A communications network 140 (e.g., the Internet, a wide area network (WAN), a local area network (LAN), or a personal area network (PAN)) connects various components of system 100. Alternatively, the client device 102 can communicate with the POS terminal 122 directly via near field communications (NFC).

Communications network 140 may include one or more communication networks or media of digital data communication. Examples of communication network 140 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 140 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

In some embodiments, a merchant processor 160 has a non-transitory machine readable storage device storing a merchant database 162 containing information about business entities and/or chains of business entities. For example, in some embodiments, the merchant database 162 stores respective refund policies of a plurality of merchants. The database can store a plurality of return policies for respectively different products or classes of products sold by any given one of the plurality of merchants.

In other embodiments, each merchant has its own respective merchant database 162, and the merchant processor 160 is the respective enterprise server of the merchant. The database 162 stores a plurality of return policies for respectively different products or classes of products sold by that merchant.

In some embodiments, a manufacturer processor 170 has a non-transitory machine readable storage device storing manufacturer database 172 containing information about manufacturers. For example, in some embodiments, the manufacturer database 172 stores respective warranty policies of a plurality of manufacturers and their products. In some embodiments, the warranty policies specify a length of a warranty period. In some embodiments, the manufacturer can provide specific warranty limitations, such as disclaiming coverage for certain types of damage (e.g., a cracked display screen or case in a laptop computer).

In some embodiments, the metadata server 150, merchant server 160 and manufacturer server 170 are operated by a central authority or financial institution.

In some embodiments, a buyer enters an exchange in which the merchant provides a first asset 180 to the buyer in return for the buyer providing a second asset (e.g., digital currency or other medium of exchange) to the seller. In some embodiments, the first asset 180 comprises one or more goods. In some embodiments, the first asset 180 is a network connected device having a bi-directional communication module 181, embedded electronics and/or a processor 182 and software, and/or sensors 183 that enable the device to collect and exchange data (also referred to as an Internet-of-things (IoT) device). In other embodiments, the first asset includes services, financial assets, intangible assets and/or digital media access rights.

Although FIG. 1 shows three client block chain peer processors 124, 128, 132, any number of block chain peer processors can be included. Although one client device 102, is shown in this example, any number of client devices can be included. Although one POS terminal 122 is shown in this example, any number of POS terminals can be included.

Figure 2:
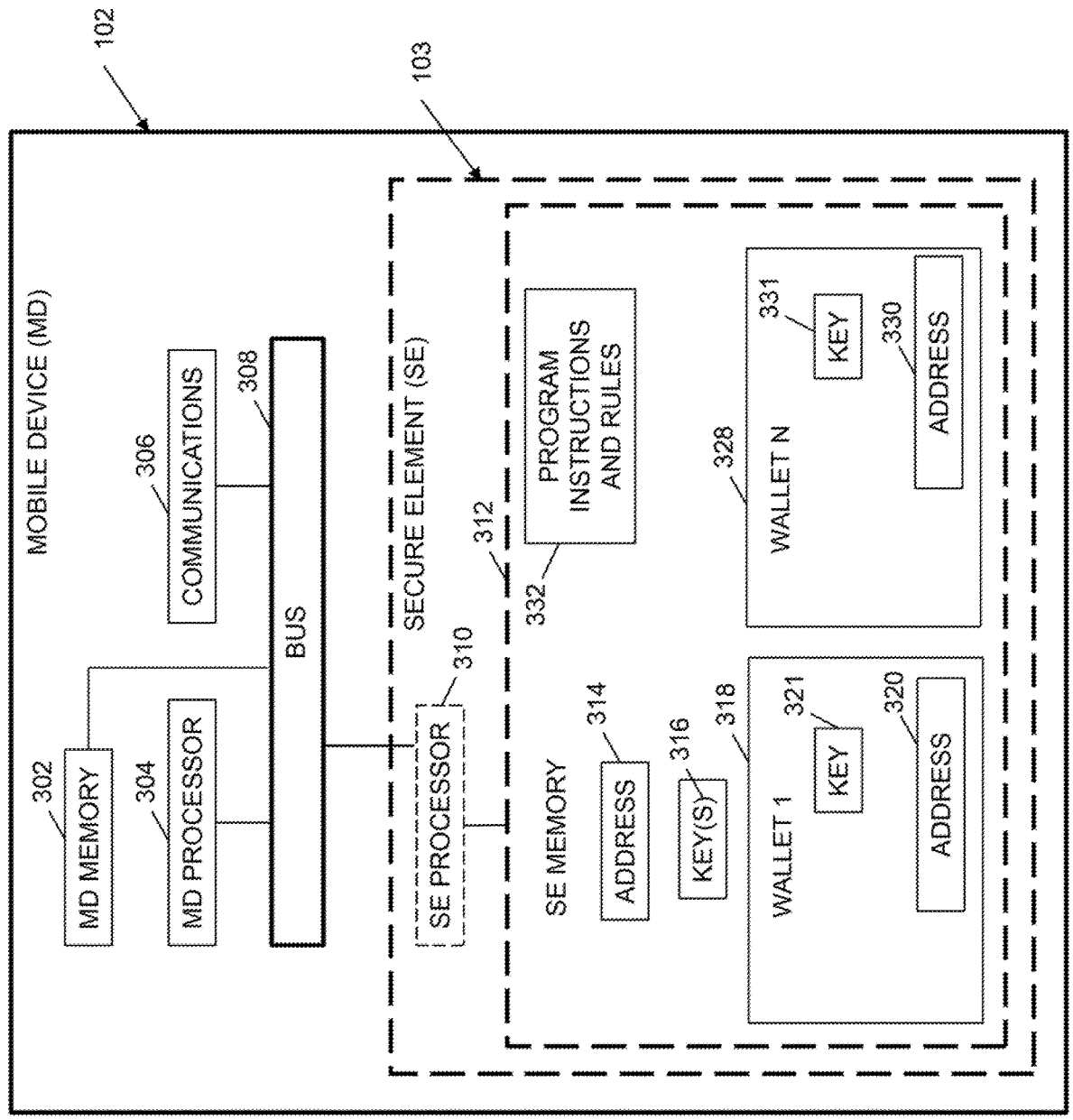
FIG. 2 is a block diagram of an embodiment of the client device shown in FIG. 1.

FIG. 2 is a block diagram of an example of a client device 102 as shown in FIG. 1 according to some embodiments. The client device 102 can be a mobile device (e.g., laptop, tablet, phone, smart watch, or the like). The client device 102 has a memory 302 storing program instructions and data, a processor 304, a bus 308, and a communications module 306. The communications module 306 provides one or more communications channels, such as PSTN, Ethernet, WiFi (IEEE 802.11), Bluetooth, or the like. In some embodiments, the memory 302 stores one or more wallets 318, 328 of the user. Each wallet 318 has an address 320 and an encryption key 321.

In some embodiments, the client device 102 can include a secure element (SE) 103 such as a Universal Integrated Circuit Card (UICC), embedded SE or microSD, and the digital wallets and keys are stored in the SE 103. The secure element 103 has its own processor 310, memory 312, key(s) 316, and program (or function(s)) 332 performed by the processor 310. In some embodiments, the secure element 103 is configured to communicate with the secure element reader 426 of POS terminal 122. In embodiments having an SE 103, the secure elements 103 in each respective client 102 store one or more digital wallets 318, 328 (including an address 320, 330 and one or more keys 321, 331) of the respective user 108.

FIG. 3 is a block diagram of a POS terminal 122 according to some embodiments. The POS terminal 122 has a POS processor 123 for executing instructions, and a POS memory 121, which stores data 121A and program instructions 121B. POS terminal 122 can include a cash drawer, computer, and input/output devices, such as a display 420, keypad 422, a 1-dimensional or 2-dimensional scanner 424, a printer 425, and a secure element reader 426. The POS terminal 122 can also include other devices (not shown), such as a keyboard, receipt printer, and a debit/credit card reader, configured for processing retail transactions. The secure element reader 426 may be used by, or on behalf of, a buyer or retail customer to present a means of payment. In various embodiments, the means of payment can be a credit card, debit card, prepaid card, a chip card, or wallet hardware device. In some embodiments, the POS terminal 122 is equipped with an internal secure element 120. The secure element 120 stores the merchant's private key 412, and provides the merchant's signature when appropriate. The merchant's secure element 120 also stores one or more tracked assets such as one or more digital wallets (e.g. a wallet owned by a merchant) for receiving payments from buyers, denominated in digital currency.

In some embodiments, the POS terminal 122 has a non-transitory machine readable storage medium 121 storing a set of computer program instructions; and a processor 123 coupled to the storage medium 121, such that when the processor 123 executes the computer program instructions, the processor 123 provides an interface for prompting a user to present his/her payment instrument (e.g., credit, debit or prepaid card, hardware wallet, mobile phone, or the like). In some embodiments, the buyer's secure element 103 interacts with the secure element reader 426 of the POS terminal 122 to request a payment transaction transferring an amount of a digital currency from the buyer's account to the merchant's account.

In some embodiments, the POS terminal 122 executes instructions to append merchant metadata to the transaction message and transmitting the message with the metadata to the metadata server 150 for incorporation into the metadata database. These can include data which are automatically obtained by the merchant at the time of sale, such as SKU level data, merchant classification, location of transaction, Transaction ID, or the like.

In some embodiments, the POS terminal 122 requests that the merchant processor 160 access the merchant database 162 and provide the terms of the merchant's return policy for this particular transaction. In some embodiments, the return policy is a general store policy across goods and customers. In some embodiments, the merchant has a plurality of return policies, each associated with one or more classes of goods. In some embodiments, the merchant has a plurality of return policies, each associated with different classes of customers (e.g., the merchant can sell premium memberships entitling buyers to a longer return period). The return policy information can be appended to the transaction with the other metadata.

In some embodiments, the POS terminal 122 requests that the manufacturer processor 170 access the merchant database 172 and provide the terms of the manufacturer's warranty policy for this particular transaction. In some embodiments, the warranty policy is a general manufacturer policy across goods and customers. In some embodiments, the manufacturer has a plurality of warranty policies, each associated with one or more classes of goods. In some embodiments, the manufacturer or the merchant offers a plurality of warranty policies, which the customer can purchase. The warranty policy information can be appended to the transaction with the other metadata.

In some embodiments, the metadata can also include information about the buyer, which may be available from a previous relationship or transaction between buyer and merchant, or may be input at the time of this transaction. For example, the metadata can include the buyer's contact information and/or identification of other payment instruments and accounts which the same buyer has used previously.

In some embodiments, the POS terminal 122 subsequently uses the metadata database for automating the processing of a merchandise or digital rights return.

FIG. 7 is a diagram of a record associated with one transaction in the metadata database. In some embodiments, the record indicates whether the first asset 180 is returnable, the number of days within which the first asset 180 can be returned for full refund, the number of additional days (after the end of the full refund period) in which the first asset 180 can be returned for a partial refund, whether the first asset 180 must be free from damage or failure to qualify for return, whether the first asset 180 has a consumable material, whether the first asset 180 can be returned after some or all of the consumable material has been consumed, a percentage reduction in the refund if the materials have been consumed, and the maximum number of hours that the first asset 180 can be used and still qualify for return.

In some embodiments, the POS terminal 122 obtains warranty information from the Manufacturer's database 172, and the metadata record includes whether warranty coverage is available for any detected hardware failure, and the length of the warranty period.

Referring back to FIG. 1, peer systems 124, 128, 132 may include one or more special purpose hardware and/or computing systems configured to execute software instructions to perform one or more operations in accordance with various embodiments. In some embodiments, peer systems 124, 128, 132 may include computing components configured to store, maintain, and generate data and software instructions. For example, each of peer systems 124, 128, 132 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In some embodiments, one or more of peer systems 124, 128, 132 are configured to receive, from client device 102 across network 140, information associated with a distribution of, transaction involving, or other action associated with one or more assets tracked within block-chain ledgers 126, 130, 134 in accordance with various embodiments.

In some embodiments, one or more of peer systems 124, 128, 132 are configured (e.g., by the executed software programs) to validate the received information and to generate a new block of the block-chain ledger 126, 130, 134. The new block includes the received information, either alone (e.g., using a "one transaction, one block" paradigm) or in combination with information identifying additional distributions, transactions, or other actions associated with one or more tracked assets (e.g., as a multiple-transaction block). In some embodiments, the one or more peer systems 124, 128, 132 may maintain the updated versions of the public ledger (i.e., the latest, longest public ledger), and may provide the updated version of the ledger to client devices 102, 104, and/or 106 (or other client devices associated with other users) upon receipt of a request across network 120 and/or at regular or predetermined intervals.

In some embodiments, in addition to a connection with network 120, peer systems 124, 128, 132 may be interconnected across a peer-to-peer network (not depicted in FIG. 1) using any of the wired or wireless communications protocols outlined above. Further, in some instances, one or more of peer systems 124, 128, 132 may function as a "miner," where any miner may be compensated in units of a virtual currency (e.g., "Bitcoin™", Ethereum™") for validating the received data and for generating updated versions of the block-chain ledger.

FIG. 4 is a flow chart of a method of checking out and storing metadata, as performed by the POS terminal 122 according to some embodiments.

At step 450, the POS terminal 122 initiates a check out of a first asset 180, such as goods or digital rights to be purchased by a buyer.

At step 452, the buyer presents a payment device to initiate a transaction to transfer a second asset, such as an amount of digital currency, to the merchant as payment for the first asset 180. In some embodiments, the buyer enters information via a keyboard interface. In other embodiments, the buyer places the payment device in or proximate the secure element reader 426 of the POS terminal 122.

At step 454, the POS terminal 122 generates and transmits a request for validation of a first exchange of a first asset 180 of a seller for a second asset of a buyer. The POS processor 123 can transmit this request to the merchant's central enterprise server (not shown). The enterprise server can apply the merchant's internal criteria for accepting the proffered digital currency, which can include one or more of: verifying that the amount of the transaction is within the credit limit for this buyer, verifying that the buyer's account payment history with the merchant is in good standing, verifying that the same buyer has not previously double-spent at any of this merchant's stores from the same digital currency account, verifying that the amount of this purchase is within a maximum amount accepted using this digital currency, or the like. In other embodiments, the merchant's central enterprise server The POS terminal receives a validation of the first exchange from the merchant's enterprise server. This internal verification by the merchant is separate from block chain confirmation of the transaction by the peer processors 124, 128, 132 after the transaction is submitted to the block chain.

At step 456, the POS terminal 122 querying the electronic merchant database 162 and obtains from the merchant database 162 a subset of the parameters associated with the first asset 180. The parameters define a second exchange (i.e., a return) in which the first asset 180 is surrendered in exchange for at least a portion of the second asset (e.g., digital currency) that was used to make the purchase of the first asset 180. In some embodiments, the conditions define a return policy for relinquishing the first asset 180 in exchange for at least a partial refund of a purchase price of the first asset 180.

At step 458, the POS terminal automatically provides a program based on a subset of the parameters, where the program contains instructions for executing the second exchange in the case where one or more conditions based on the subset of the parameters are satisfied. For example, the program can be a smart contract for executing the return if one or more conditions based on the subset of the parameters of the merchant's return policy obtained from the merchant database 162 are satisfied, or for refusing to accept the returned product if one or more conditions are not satisfied. A smart contract includes conditional entries into the transactions on a blockchain that are automatically executed if the parameters of a transaction meet the conditions. These entries can be added to each block.

At step 460, the POS terminal 122 transmits the program (e.g., smart contract) and a first record of the first exchange (e.g., the transaction transferring the second asset from buyer to seller) to a plurality of peer processors 124, 128, 132 for storage in a distributed electronic ledger (e.g., a block chain ledger 126).

At step 462, the first exchange (the sale) is executed by transferring the first asset 180 to the buyer and transmitting a transaction transferring the second asset (e.g., an amount of a digital currency) from the buyer's address to the seller's address at the time the program and the first record are transmitted and processed by the block chain peer processors 124, 128, 132. Thus, the asset transferred by the buyer is not placed in escrow or locked up waiting for expiration of the return period. The second asset is available to the merchant upon confirmation of the transfer from the block chain.

At step 464, the POS terminal 122 transmits metadata associated with the first exchange to a server 150 that stores the metadata in a metadata database 152, and the metadata includes at least a transaction identifier (ID) of the first exchange (the sale) and a block number of a block in the block chain ledger where the transaction is recorded.

FIG. 5 is a flow chart of the method performed by the POS terminal 122 during a return of the first asset 180 by the buyer.

At step 500, the POS terminal 122 receives a first request to execute the second exchange (e.g., return of the first asset 180) from the buyer. In the case of tangible goods, the buyer can present the goods to the merchant for return. In the case of digital media rights (e.g., access to audio, video, information, or literature content), the buyer can initiate the transaction using a user interface (such as a graphical user interface) of the merchant.

At step 502, the POS terminal 122 obtains the transaction ID and the block number from the metadata database 152. The query can be based on one or more of the parameters included in the database 152.

At step 504, the POS terminal 122 retrieves the block from the block chain using the transaction ID and the block number.

At step 506, the POS terminal 122 retrieves the program from the block by decrypting the block to access the set of rules stored in the distributed electronic ledger, where the set of rules specifies conditions associated with the first request.

At step 508, the POS terminal 122 executes the program (e.g., the smart contract). In some embodiments, the smart contract includes two transactions (exchanges). In the first transaction, the buyer transfers an amount of the second asset to the merchant. The second transaction (the return) is a conditional transaction with an expiration date, stored in the smart contract in the block chain. If the goods are not relinquished or returned before the end of the expiration period, the second transaction is null.

At step 510, the program executed in the POS terminal 122 determines whether all of the conditions for accepting the return/relinquishment are satisfied. If all conditions are met, step 512 is executed. If fewer than all of the conditions are satisfied, step 514 is executed.

At step 512, in the case where each of the one or more conditions are satisfied, the POS terminal 122 transmits a second record of the second exchange to the plurality of peer processors 124, 128, 132 for storage in the block chain. The second exchange transfers the first asset 180 to the seller and transfers at least a portion of the second asset to the buyer at a time the second record is transmitted.

At step 514, the return request is invalidated.

Figure 6:
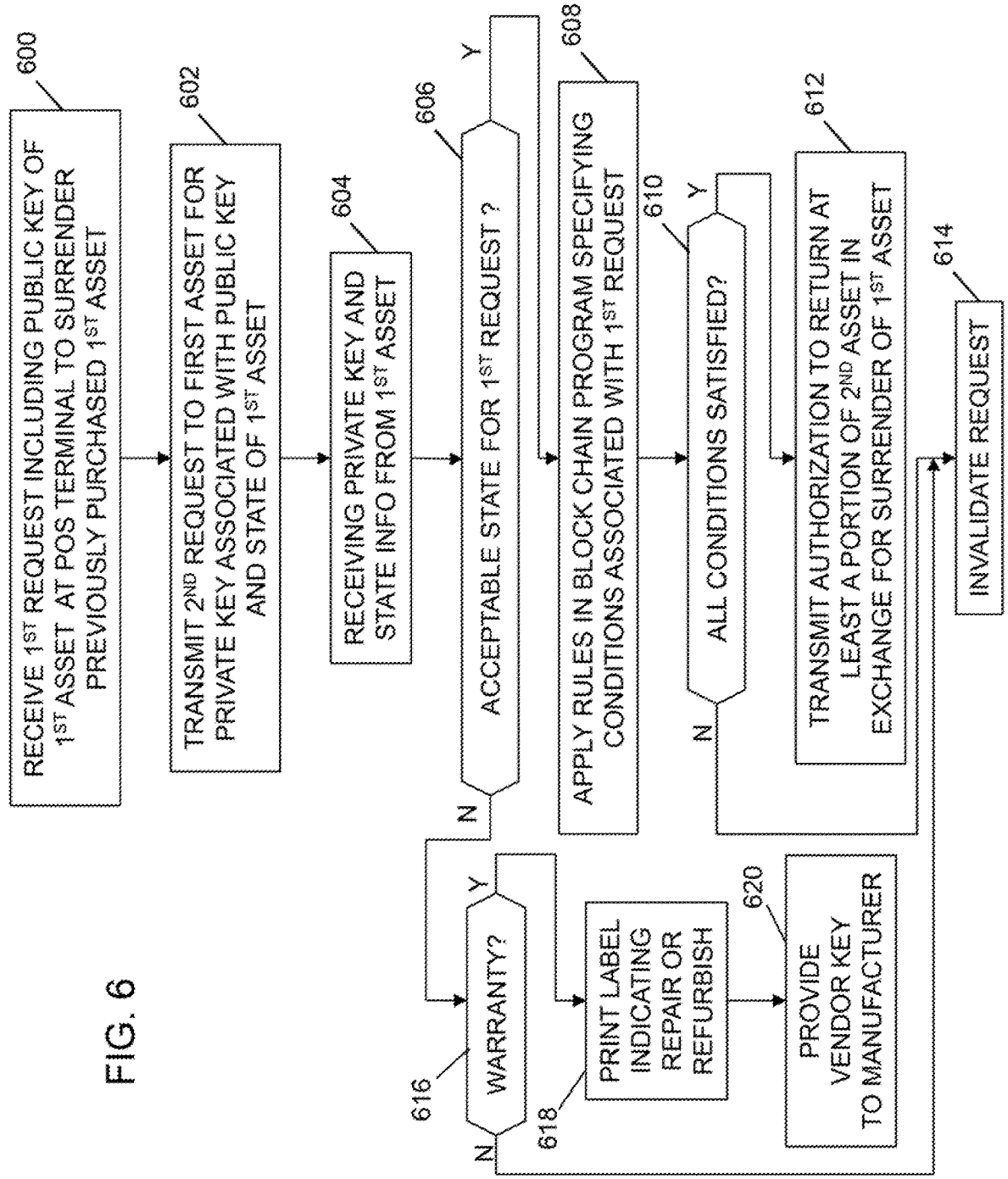
FIG. 6 is a flow chart of details of an embodiment of the step of applying the conditions in the return process of FIG. 5.

FIG. 6 is a flow chart of an exemplary program executed by the POS terminal 122 during the return process.

At step 600, the POS terminal 122 receives a first request from the buyer to surrender a previously purchased first asset 180 in exchange for return of at least a portion of the second asset, where the second asset was used to purchase the first asset 180, and the first request includes a public key of the first asset 180. For example, the buyer can request that the merchant return part or all of the digital currency used in the original purchase to the same account, from which the buyer paid the merchant.

At step 602, the POS terminal transmits a second request to the first asset 180 for a private key associated with the public key. In the case where the first asset 180 is a networked device (e.g., an Internet-of-things or IoT device), such as a printer, television, automotive vehicle, BD-ROM player, smart watch, the second request is sent directly to the networked device. In some embodiments, the second request includes a command for the first asset 180 to transmit a message describing a state of the first asset 180.

At step 604, the POS terminal receives the private key associated with the public key from the first asset 180. In some embodiments, where the distributed electronic ledger is a block chain ledger, for validation, the buyer's request to return the first asset 180 further includes the private key of the user making the first request.

The first asset 180 also transmits its state information. In some embodiments, if the device has been damaged, the device provides a hardware failure code. In some embodiments, the state of the first asset 180 identifies whether a circuit or processor in the first asset 180 detects a hardware failure in the first asset 180, and at least one of the conditions is not satisfied in the case where the first asset 180 detects a hardware failure. In some embodiments, if the device includes a consumable material (e.g., an ink or toner supply of a networked printer), the device provides an indication of the amount or fraction of the consumable material remaining. In some embodiments, where the device tracks the length of time it has been operated, the state is an indication of how many hours the device has been used since purchase.

At step 606, the POS terminal 122 applies the rules in the smart contract to determine whether the current state of the first asset 180 (as reported electronically by the first asset 180) is an acceptable state in which the buyer can return or relinquish the asset and receive a partial or full refund of the second asset. For example, a printer may only be eligible for partial refund if part or all of the consumable material (e.g., ink or toner) has been consumed. In some embodiments, at least one of the conditions is not satisfied in the case where the amount of the consumable remaining is less than an original amount of the consumable material at a time the first asset 180 was purchased, or where the fraction of the original amount of the consumable material remaining in the first asset 180 is less than 100%. In another example, a television may only be eligible for a partial refund if the buyer has watched the television more than a threshold number of hours since purchase. If the state is an acceptable state for return, step 608 is executed. If the state is not an acceptable state for return, step 616 is executed.

At step 608, the POS terminal 122 applies the rules specified in the program (e.g., smart contract) retrieved from the block chain. For example, the rules can include additional conditions that apply regardless of the state information received from the first asset 180. In some embodiments, the return policy specifies a limited period during which the buyer has the option to return the goods for a full or partial refund. For example, in some embodiments, the set of rules specify a return period, and the conditions are not satisfied in the case where the first request is received after an end of the return period. In some embodiments, in the case where the first asset 180 is a right to access an electronic information source, the program includes computation of an amount of the portion of the second asset based on a time the program is executed. In some embodiments, the rules specify that a restocking fee be subtracted from any refund. In some embodiments, where the first asset 180 is access to digital media for a specified subscription period, the state identifies the percentage of the subscription period that has passed at the time the request to return the second asset is made. In some embodiments, the rules allow an exchange or store credit—but not a refund—after a predetermined period of time.

At step 608, the POS terminal 122 determines whether all of the return conditions have been satisfied. If the conditions are all satisfied, step 610 is performed. If fewer than all of the conditions are satisfied, step 614 is performed.

At step 612, in the case where the conditions are satisfied, the POS terminal 122 transmits an authorization to return the at least a portion of the second asset in exchange for surrender of the first asset 180. Upon an indication by the merchant that the first asset 180 has been relinquished and inspected, the program transmits a transaction to the block chain to transfer at least a portion of the second asset to the address associated with the buyer. In some embodiments the merchant inputs a vender key to the POS terminal 122 to confirm that the first asset 180 has been returned and inspected. The rules can specify that at least one of the conditions is not satisfied in the case where the vendor key is not input. In the case where digital media access rights.

At step 614, in the case where one or more of the conditions are not satisfied, the POS terminal 122 invalidates the first request. The merchant does not accept the return of the first asset 180.

At step 616, in the case where the state of the first asset 180 is not acceptable for return (and refund) because of a hardware failure or defect reported by the first asset 180, the POS terminal 122 determines whether the first asset 180 is covered by a warranty, based on the information obtained from the metadata database 152. For example, the POS terminal 122 determines whether the warranty claim has been made before expiration of the warranty period. In some embodiments, in the case where the warranty period has not expired, and the warranty includes exclusions and/or disclaimers, the POS terminal 122 determines whether warranty coverage is excluded by any exclusion or disclaimer. If the warranty period has not expired, and no exclusion or disclaimer is applicable, then warranty coverage is available, and step 618 is executed. If warranty coverage is not available, step 614 is executed.

At step 618, the POS terminal 122 approves the warranty claim and prints a shipping label (e.g., using printer 425) indicating whether the first asset 180 is being sent to the manufacturer for repair or refurbishment. In some embodiments, the POS terminal 122 selects "repair" for certain types of defects and "refurbishment" for other types of defects. In other embodiments, a manufacturer service processor generates a label indicating a repair or refurbishment to be performed in the case where the circuit or processor in the first asset detects a hardware failure, and transmits a digital representation of the label to the POS terminal for printing. The manufacturer service processor can be the processor 170 shown in FIG. 1, or a separate processor at the manufacturer's service facility.

At step 620, in the case where the POS terminal 122 is approving transfer of the first asset to the manufacturer for repair or refurbishment, in some embodiments, the manufacturer's service facility transmits to the POS terminal 122 a third request for a vendor key. The manufacturer's service facility accepts the warranty claim in the case where it is accompanied by the vendor key, and determines that at least one of the conditions for providing warranty coverage is not satisfied in the case where the vendor key is not received in response to the third request.

In other embodiments, where the first asset 180 has a defect or malfunction, the buyer can proceed directly with a warranty claim at step 616. For example, in some embodiments, the state of the first asset 180 identifies whether a circuit or processor 182 in the first asset 180 detects a hardware failure in the first asset, and at least one of the conditions for a warranty claim is not satisfied in the case where the circuit or processor 182 in the first asset does not detect a hardware failure.

Examples are discussed above in which the merchant policy database 160, manufacturer policy database 170 and metadata database 152 are used to automate purchase, return and or warranty claims of an IoT device 180. In other embodiments, the metadata database is used for automating exchanges of non-IoT devices and property, services, digital media access rights, digital currency, or intangible assets.

Examples are discussed above in which the exchange is between a client device 102 and a POS terminal 122. In other embodiments (not shown), the exchange can be between two client devices, or between two POS terminals.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
 a non-transitory, machine-readable storage medium encoded with program instructions, and
 a processor coupled to the storage medium, wherein the program instructions, when executed by the processor, cause the processor to perform the steps of:
  receiving a first request to surrender a previously purchased first asset in exchange for at least a portion of a second asset used to purchase the first asset, the first asset comprising a networked device, and the first request comprising a public key of the networked device;
  transmitting, to the networked device, a second request for a private key of the networked device, wherein the private key of the networked device is associated with the public key of the networked device;
  receiving, in response to the second request, the private key of the networked device;
  accessing an encrypted set of rules stored in a distributed electronic ledger, and decrypting the encrypted set of rules using the private key of the networked device, the decrypted set of rules comprising conditions associated with the first request;
  determining that the first request satisfies the conditions;
  based on the determination that the first request satisfies the conditions, transmitting, to a computing system associated with the networked device, an authorization to return at least the portion of the second asset in exchange for the surrender of the networked device, and transmitting a request to record transaction data associated with the authorization to one or more peer processing systems; and
  receiving an updated distributed electronic ledger from the one or more peer processing systems, and storing the updated distributed electronic ledger within the storage medium, the updated distributed electronic ledger comprising an additional element of ledger data that includes at least a portion of the transaction data.

2. The system of claim 1, wherein the distributed electronic ledger includes a block chain ledger, the set of rules comprise a return policy for relinquishing the first asset in exchange for at least a partial refund of a purchase price of the first asset, and the first request further includes a private key of a user associated with the first request.

3. The system of claim 2, wherein:

the set of rules comprise a return period associated with the return policy; and executing the program instructions causes the processor to perform the step of determining that the first request fails to satisfy the at least one of the conditions when the first request is received after an end of the return period.

4. The system of claim 1, wherein the second request includes a command instructing the networked device to transmit a message describing a state of the first asset to the system, and wherein executing the program instructions causes the processor to perform the step of receiving the message describing the state of the first asset.

5. The system of claim 4, wherein:
the state includes an amount of a consumable material remaining in the networked device; and
executing the program instructions causes the processor to perform the step of determining that the first request fails to satisfy the at least one of the conditions when the amount of the consumable material remaining is less than an original amount of the consumable material.

6. The system of claim 4, wherein:
the state includes a fraction of an original amount of a consumable material of the networked device; and
executing the program instructions causes the processor to perform the step of determining that the first request fails to satisfy the at least one of the conditions when the fraction is less than unity.

7. The system of claim 4, wherein:
the state of the networked device identifies a hardware failure; and
executing the program instructions causes the processor to perform the step of determining determine that the first request fails to satisfy the at least one of the conditions based on the hardware failure.

8. The system of claim 4, wherein executing the program instructions further causes the processor to perform the steps of:
transmitting, to the POS terminal, a third request for a vendor key; and
determining that the first request fails to satisfy the at least one of the conditions when the vendor key is not received in response to the third request.

9. The system of claim 4, wherein:
the distributed electronic ledger is a block chain ledger;
the set of rules comprise a warranty policy for at least a partial refund of a purchase price of the networked device; and
executing the program instructions further causes the processor to perform the steps of:
based on the received message, determining that the state of the networked device does not identify a hardware failure; and
determining that the first request fails to satisfy the at least one of the conditions when the state of the networked device fails to identify the hardware failure.

10. The system of claim 9, wherein:
the system further comprising a printer coupled to the processor; and
executing the program instructions further causes the processor to perform the steps of:
based on the received message, determining that the state of the first asset comprises a hardware failure; and based on the determination, causing the printer to generate a label indicating a repair or refurbishment to be performed when the state of the first asset comprises the hardware failure.

11. The system of claim 1, wherein:
the second asset comprises an amount of a digital currency;
the distributed electronic ledger comprises a block chain ledger; and
executing the program instructions further causes the processor to perform the steps of:
determining at least one a transaction identifier or a block number associated with the previous purchase of the networked device;
obtaining a ledger block of the block chain ledger based on the at least one of the transaction identifier or the block number, the ledger block comprising encrypted data; and
decrypting the encrypted data within the ledger block and extracting the set of rules from the decrypted data.

12. The system of claim 1, wherein executing the program instructions further causes the processor to perform the steps of:
loading an encrypted element of ledger data associated with the distributed electronic ledger from the storage medium;
decrypting the encrypted element of ledger data; and
obtaining the decrypted set of rules from the decrypted element of ledger data.

13. The system of claim 1, wherein executing the program instructions further causes the processor to perform the step of
when the first request satisfies the conditions, generating transaction data associated with the authorization to return at least the portion of the second asset in exchange for the surrender of the networked device.

14. A computer-implemented method, comprising:
receiving, using at least one processor, a first request to surrender a previously purchased first asset in exchange for at least a portion of a second asset used to purchase the first asset, the first asset comprising a networked device, and the first request comprising a public key of the networked device;
transmitting, using the at least one processor, and to the networked device, a second request for a private key of the networked device, wherein the private key of the networked device is associated with the public key of the networked device;
receiving, using the at least one processor, and in response to the second request, the private key of the networked device;
using the at least one processor, accessing an encrypted set of rules stored in a distributed electronic ledger, and decrypting the encrypted set of rules using the private key of the networked device, the decrypted set of rules comprising conditions associated with the first request;
determining, using the at least one processor, that the first request satisfies the conditions; and
based on the determination that the first request satisfies the conditions, transmitting, using the at least one processor, and to a computing system associated with the networked device first asset, an authorization to return at least the portion of the second asset in exchange for the surrender of the networked device and transmitting, using the at least one processor, a request to record transaction data associated with the authorization to one or more peer processing systems; and using the at least one processor, receiving an updated distributed electronic ledger from the one or more peer processing systems, and storing the updated distributed electronic ledger within a data repository, the updated distributed electronic ledger comprising an additional element of ledger data that includes at least a portion of the transaction data.

15. The computer-implemented method of claim 14, wherein:

the decrypted set of rules comprise a return policy, the return policy being associated with a return period; and the computer-implemented method further comprises determining, using the at least one processor, that the first request fails to satisfy the at least one of the conditions when the first request is received after an end of the return period.

16. The computer-implemented method of claim 14, further comprising, based on the determination that the first request satisfies the conditions, generating, using the at least one processor, the transaction data associated with the authorization to return at least the portion of the second asset in exchange for the surrender of the networked device.

17. The computer-implemented method of claim 14, further comprising:

receiving, using the at least one processor, a message from the networked device, the message comprising a state of the networked device;

based on the message, establishing, using the at least one processor, that the state of the networked device first asset includes a hardware failure; and determining, using the at least one processor, that the first request fails to satisfy the at least one of the conditions based on the hardware failure.

18. A tangible, non-transitory computer-readable medium storing instructions that, when executed by at least one processor, cause the at least one processor to perform a method, comprising:

receiving a first request to surrender a previously purchased first asset in exchange for at least a portion of a second asset used to purchase the first asset, the first asset comprising a networked device, and the first request comprising a public key of the networked device;

transmitting, to the networked device, a second request for a private key of the networked device, wherein the private key of the networked device is associated with the public key of the networked device;

receiving, in response to the second request, the private key of the networked device;

accessing an encrypted set of rules stored in a distributed electronic ledger, and decrypting the encrypted set of rules using the private key of the networked device, the decrypted set of rules comprising conditions associated with the first request;

determining that the first request satisfies the conditions;

based on the determination that the first request satisfies the conditions, transmitting, to a computing system associated with the first asset, an authorization to return at least the portion of the second asset in exchange for the surrender of the networked device, and transmitting a request to record transaction data associated with the authorization to one or more peer processing systems; and receiving an updated distributed electronic ledger from the one or more peer processing systems, and storing the updated distributed electronic ledger within a data repository, the updated distributed electronic ledger comprising the additional element of ledger data that includes at least comprising at least a portion of the transaction data.

19. The system of claim 1, wherein executing the program instructions further causes the processor to perform the steps of:

determining that the first request fails to satisfy at least one of the conditions; and invalidating the first request based on the determination that the first request fails to satisfy at least one of the conditions.

20. The system of claim 1, wherein the updated distributed electronic ledger further comprises the encrypted set of rules.

* * * * *